United States Patent [19]

Hungenberg et al.

[11] Patent Number: 5,166,270
[45] Date of Patent: Nov. 24, 1992

[54] THERMOPLASTIC MOLDING MATERIALS BASED ON VINYL CHLORIDE

[76] Inventors: Klaus-Dieter Hungenberg, 135 Ortsstrasse, 6943 Birkenau; Rainer Bueschl, 14 Hollandstrasse, 6701 Roedersheim-Gronau, both of Fed. Rep. of Germany

[21] Appl. No.: 500,932

[22] Filed: Mar. 29, 1990

[30] Foreign Application Priority Data

Apr. 20, 1989 [DE] Fed. Rep. of Germany ....... 3912974

[51] Int. Cl.$^5$ .................. C08L 33/08; C08L 33/10
[52] U.S. Cl. .................................... 525/227; 525/230
[58] Field of Search .................. 525/227, 230; 526/326

[56] References Cited

U.S. PATENT DOCUMENTS 3,655,826  4/1972  Fellmann et al. ..................... 525/227

FOREIGN PATENT DOCUMENTS 2916170  10/1980  Fed. Rep. of Germany .
1911465  3/1991  Fed. Rep. of Germany .
2557573  7/1985  France .
1400848  7/1975  United Kingdom .

OTHER PUBLICATIONS

Krause, Gormley, Roman, Shetter, Watanabe, J. Polym. Sci., A. 3, 3473 (1965).

Primary Examiner—Jacob Ziegler
Attorney, Agent, or Firm—Herbert B. Keil

[57] ABSTRACT

Thermoplastic molding materials obtained from polymers based on vinyl chloride contain from 2 to 80% by weight of a polymer of
a) from 2 to 100% by weight of a monomer of the general formula I

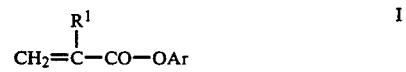

where $R^1$ is hydrogen or $C_1$–$C_4$-alkyl and Ar is an isoaromatic group, or of a mixture of these monomers, and
b) from 0 to 98% by weight of a monomer of the general formula II

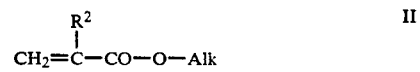

where $R^2$ is $C_1$–$C_4$-alkyl and Alk is $C_1$–$C_8$-alkyl, or of a mixture of these monomers, and
c) from 0 to 5% by weight of further monomers capable of undergoing free radical polymerization (monomers III).

The molding materials have a high heat distortion resistance.

1 Claim, No Drawings

THERMOPLASTIC MOLDING MATERIALS BASED ON VINYL CHLORIDE

The present invention relates to thermoplastic molding materials obtained from polymers based on vinyl chloride, containing from 2 to 80% by weight of a polymer of a) from 2 to 100% by weight of a monomer of the general formula I

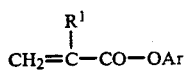

where $R^1$ is hydrogen or $C_1$–$C_4$-alkyl and Ar is an isoaromatic group, or of a mixture of these monomers, and b) from 0 to 98% by weight of a monomer of the general formula II

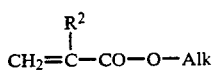

where $R^2$ is $C_1$–$C_4$-alkyl and Alk is $C_1$–$C_8$-alkyl, or of a mixture- of these monomers, and c) from 0 to 5% by weight of further monomers capable of undergoing free radical polymerization (monomers III).

To increase the softening temperature of homo- and copolymers of vinyl chloride, modifiers are added to these polymers, said modifiers generally being homo- or copolymers of polar monomers containing oxygen or nitrogen.

For instance, GB-B 1 400 848 describes thermoplastic molding materials which are based on polyvinyl chloride and contain, as additives for increasing the softening temperature, copolymers of acrylonitrile and α-methylstyrene. Since industrial polymers of this type always contain some free acrylonitrile, their use is limited. Owing to the toxicity of the acrylonitrile, the use of such molding materials presents problems, especially in the food sector.

DE-A 1 911 465 discloses graft copolymers which are based on polyvinyl chloride and are obtained by mixing polyvinyl chloride and polymers of olefinically unsaturated compounds, such as polymethyl methacrylate, in the presence of an initiator, but such graft copolymers can be reproduced in constant quality only to a limited extent.

It is an object of the present invention to remedy the deficiencies described.

We have found that this object is achieved by the thermoplastic molding materials defined at the outset and based on polyvinyl chloride.

Homo- and/or copolymers of aryl and/or alkyl esters of acrylic acid and of alkylacrylic acids are known or are obtainable by known methods (cf. Krause et al., J. Polym. Sci., A. 3 (1965) 3573).

The amount of the monomers I is from 2 to 100, preferably from 5 to 75, % by weight.

Suitable monomers I are mononuclear or polynuclear isoaryl esters of acrylic acid and/or of alkylacrylic acids. Examples of suitable mononuclear isoaryl esters are phenyl acrylate and phenyl methacrylate. Examples of suitable polynuclear acrylates are α-naphthyl acrylate, β-naphthyl acrylate, biphenyl acrylate, p-benzoylphenyl acrylate and p-(ω-phenylalkyl)-phenyl acrylates, such as p-(4-phenylbutyl)-phenyl acrylate. Suitable polynuclear methacrylates are biphenyl methacrylate, α-naphthyl methacrylate, β-naphthyl methacrylate, p-benzoylphenyl methacrylate and p-(ω-phenylalkyl)-phenyl methacrylate.

The aromatic nuclei may furthermore carry substituents, for example alkyl, alkoxy, nitro, nitrile or halogen.

β-Naphthyl acrylate, biphenyl acrylate, β-naphthyl methacrylate and biphenyl methacrylate are preferably used.

From 0 to 98, preferably from 25 to 95, % by weight of the monomers II are used.

Suitable monomers II are $C_1$–$C_8$-alkyl esters of acrylic acid and/or of $C_1$–$C_4$-alkylacrylic acids, for example methyl acrylate, ethyl acrylate, butyl acrylate, ethyl methacrylate, cyclohexyl methacrylate, tertbutyl methacrylate and preferably methyl methacrylate.

In addition, from 0 to 5% by weight of further monomers II capable of undergoing free radical polymerization may be copolymerized, for example vinylaromatic compounds, such as styrene or α-methylstyrene, or substituted maleimides, such as phenyl- or methylmaleimide.

The polymers can be prepared in a conventional manner by emulsion, mass, solution or suspension polymerization.

The preparation by emulsion polymerization is advantageously carried, out at from 30° to 95° C. Suitable initiators are water-soluble initiators which decompose at elevated temperatures, such as sodium peroxodisulfate or ammonium peroxodisulfate, or redox systems, such as tert-butyl hydroperoxide/sodium formaldehyde sulfoxylate.

Suitable emulsifiers are the conventional compounds, for example the alkali metal salts or fatty acids, sodium alkylsulfonates or o-dodecyldiphenyl ether disulfonate.

In the preparation by mass polymerization, oilsoluble initiators (free radical initiators), such as diacyl peroxides, peresters, peroxydicarbonates or azo compounds, such as azobisisobutyronitrile, may be used. The polymerization temperature is from 60° to 200° C., preferably from 80° to 150° C. To regulate the molecular weight, for example, mercaptans may be added.

The polymers can also be prepared by solution polymerization. Examples of suitable solvents are toluene, xylene, acetone and tetrahydrofuran. Otherwise, the polymerization can be carried out under the conditions described for the mass polymerization.

Preparation of the polymers by suspension polymerization is also possible. The monomers can be dispersed with the aid of protective colloids, such as polyvinylpyrrolidone, polyvinyl alcohol or methylcellulose.

Suitable initiators are the oil-soluble initiators described for mass polymerization. The polymerization temperature is usually from 70° to 200° C.

In addition, conventional assistants, such as sodium diphosphate or sodium polyphosphate, may be added to the polymerization mixtures.

Working up to obtain the polymers can be effected, for example, by spray drying or by coagulation with precipitating agents or freeze-coagulation with subsequent filtration and drying.

The amount of polymers to be used according to the invention is from 2 to 80, preferably from 10 to 50, % by weight, based on the total weight of the thermoplastic molding material.

The preparation of the thermoplastic molding materials can be carried out by conventional methods (cf. Kunststoff-Handbuch, Vol. 2/1, 2/2, 2nd edition).

The molding materials may contain, in addition to the polymers used according to the invention, conventional assistants, such as stabilizers, impact modifiers, lubricants, fillers and dyes and pigments.

The individual components can be mixed in a conventional mixer (extruder, kneader or roll mill) and the mixture may be brought to the desired form by processing methods conventionally used for thermoplastics, such as extrusion, injection molding, calendering, pressing, sintering, blow molding or deep drawing.

Compared with molding materials of pure PVC, the novel thermoplastic molding materials have a high heat distortion resistance and similar transparency.

EXAMPLE 1

A mixture of 600 g of distilled water, 1 g of sodium peroxodisulfate, 1 g of sodium pyrophosphate, 6 g of a mixture of sodium salts of $C_{12}$-$C_{18}$-alkylsulfonates and 36 g of methyl methacrylate and 4 g of 2-naphthyl methacrylate was heated to 70° C. under a nitrogen atmosphere and kept at this temperature for 30 minutes. Thereafter, a mixture of 324 g of methyl methacrylate and 36 g of 2-naphthyl methacrylate was added at 70° C. in the course of 3 hours. The reaction mixture was then cooled to 25° C.

The product was worked up by freeze-coagulation and drying under reduced pressure at 50° C.

EXAMPLE 2

A mixture of 400 g of tetrahydrofuran, 55 g of methyl methacrylate, 45 g of biphenyl methacrylate, 0.5 g of α,α'-azobisisobutyronitrile and 0.2 g of tert-dodecyl mercaptan was refluxed for 6 hours. The reaction mixture was then cooled and stirred into methanol.

The precipitated reaction product was filtered off and dried. Preparation of thermoplastic molding materials
50 g of PVC (K value 61),
50 g of a copolymer (Examples 1, 2),
1 g of di-n-octyltin isooctyl bisthioglycolate,
1 g of glyceryl dioleate and
0.2 g of the esters of montanic acids with ethylene glycol and 1,3-butanediol
were mixed in a roll mill at 180° C. for 8 minutes. The mixture thus obtained was then pressed to give sheets. Pressing conditions: under 200 bar and at 180° C
Preheating for 3 minutes
Pressing for 2 minutes
Cooling for 3 minutes Determination of the transparency (scattered light) was carried out using 3 mm thick sheets, and determination of the heat distortion resistance via the Vicat temperature VST/B 150 according to DIN 53,460 was effected using 4 mm thick disks.

Pure PVC moldings were used for comparison.
The test results are listed in the Table below.

TABLE

| Example | Polymer composition [% by weight] | Composition of molding material | | Vicat B [°C.] | Scattered light [%] | Tg [°C.] |
|---|---|---|---|---|---|---|
| | | PVC (K value 61) [% by weight] | Polymer [% by weight] | | | |
| According to the invention | | | | | | |
| 1 | 10 NMA/90 MMA | 50 | 50 | 91.0 | 6.3 | 96 |
| 2 | 44 BMA/56 MMA | 50 | 50 | 96.6 | 5.7 | 100 |
| For comparison | | | | | | |
| A | 0 | 100 | 0 | 77.0 | 5.7 | 79 |

NMA: Naphtyl methacrylate
BMA: Biphenyl methacrylate
MMA: Methyl methacrylate
Tg: Glass transition temperature from DSC measurements

We claim:
1. A thermoplastic molding material obtained from the polymer based on vinyl chloride and from 2 to 80% by weight of a component consisting essentially of a polymer of
   a) from 2 to 100% by weight of at least one monomer of the formula I

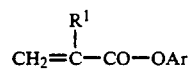

where $R^1$ is hydrogen of $C_1$-$C_4$-alkyl and Ar is an isoaromatic group, and
   b) from 0 to 98% by weight of at least one monomer of the formula II

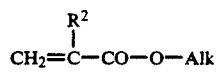

wherein $R^2$ is $C_1$-$C_4$-alkyl and Alk is $C_1$-$C_8$-alkyl, and
   c) from 0 to 5% by weight of at least one further monomer capable of undergoing free radical polymerization.

* * * * *